June 21, 1932.        W. G. O'BRYAN        1,864,461
REVOLUBLE STEP BEARING
Filed June 10, 1931
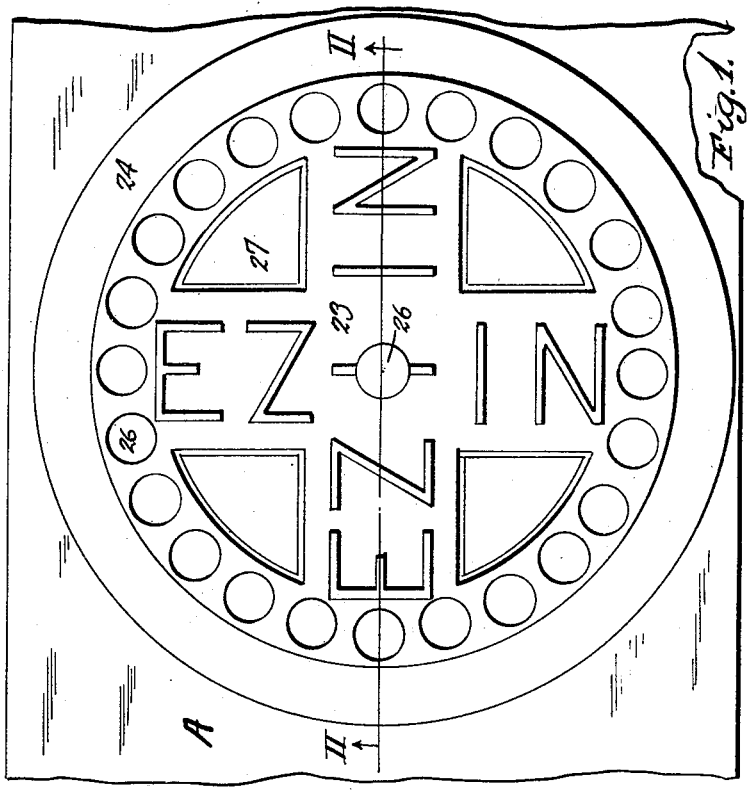
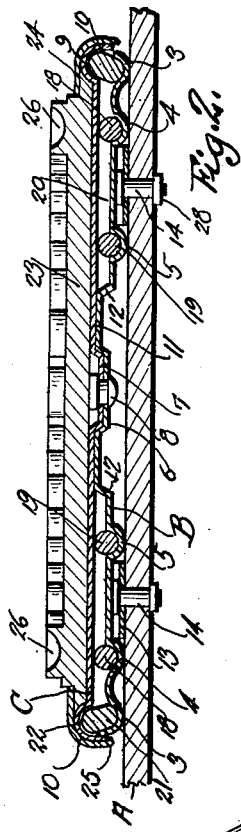
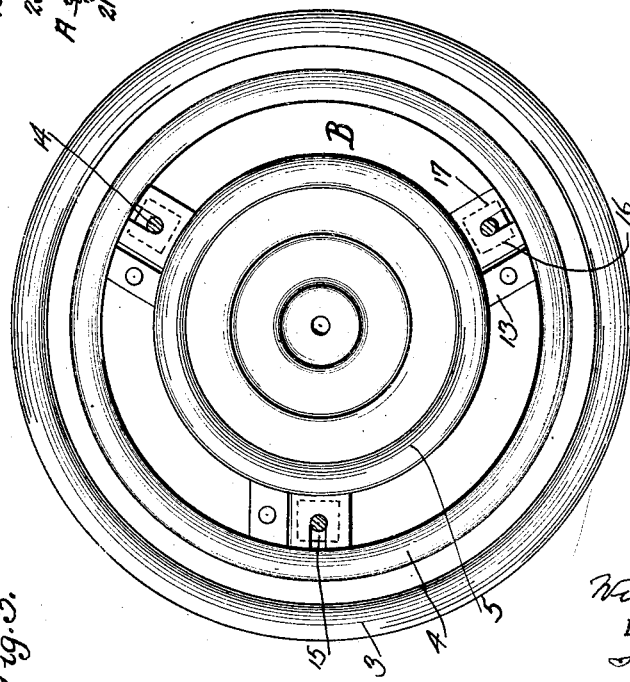
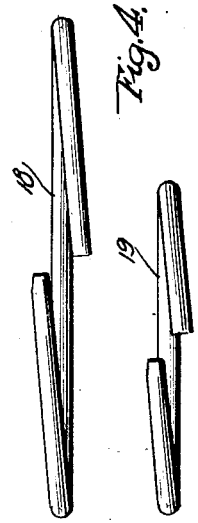
INVENTOR.
William Garvin O'Bryan
BY
Francis H. Davis.
ATTORNEY.

Patented June 21, 1932

1,864,461

UNITED STATES PATENT OFFICE

WILLIAM GARVIN O'BRYAN, OF SEASIDE, CALIFORNIA, ASSIGNOR TO DEXTER M. ROGERS, OF PACIFIC GROVE, CALIFORNIA

REVOLUBLE STEP BEARING

Application filed June 10, 1931. Serial No. 543,442.

This invention relates to step bearings adaptable for use on such places as the running boards of vehicles, although it may have other uses, and I desire Letters Patent covering the use of my novel step bearing wherever applicable.

For the present purpose I illustrate my invention as applied to what may be regarded as the running-board of an automotive vehicle.

The objects of my invention comprise the following desiderata, as well as further objects and advantages which may appear as the specification unfolds and the invention is fully understood.

To provide a revoluble step bearing of neat and attractive appearance that will be in keeping with the general trend toward elegance in fine automobiles.

To provide an article the body of which may be factory made by modern methods of stamping, and adaptable to be beautified by plating.

To provide a stationary base-member having concentric corrugations in high relief on the lower side, certain of said corrugations being spaced apart by flat areas arranged and adapted to carry a plurality of lugs, each lug provided with means mounting an insertable bolt adapted to secure the device to the running board so that said base will be locked against rotary movement, or other displacement.

To provide certain, trans-slit rings which may well be of stout gauge wire of any suitable metal such as steel or brass. Said rings being warped out of a true plane so that the respective ends will be laterally off-set from each other.

To provide an upper plate concentrically fastened to the lower plate for revoluble movement, and having a concentric, stiffening groove adjacent said fastener, said groove forming a high-relief element on the lower side of said upper plate and arranged to cooperate with a complemental groove in the base plate, to center said plates and relieve the strain and wear on said fastener.

To provide means to fasten said base and upper plate together in revoluble relation, means to secure said rings between said plates so as to suppress said warps and apply spring resistance between said plates so as to reduce chatter and aid revoluble movement when supporting the weight of a person; to provide an outer, depending flange for the upper plate and groove means in the base plate arranged to hold a wick-like packing in close contact with the interior of said flange, said packing also being arranged to act as a seal to prevent escape of lubricant from the interior of the device.

To provide a cover for said upper plate comprising a high-relief rubber element cemented thereto and provided with a bezel disposed below the level of the tread of the cover, said bezel being a press-fit over said flange and adapted to hold the edges of the cover in close contact with said upper plate.

To provide a plurality of cup-like elements on the upper surface of said cover, said elements being adapted to apply suction to the shoe of user when trodden on and thus reduce liability of the foot to slip, and minimize accident when getting in or out of the car, in wet or freezing weather especially.

To provide an article which can be packed flat with the securing bolts included and affixable thereto when ready for use.

To provide an article of the kind described appropriate to the most luxurious, or the cheaper makes of cars at a reasonable price, as hereinafter described, particularly pointed out in the claims and illustrated in the accompanying drawing attached hereto and made part hereof, in which:—

Figure 1 shows a top plan view of my invention.

Figure 2 shows a section taken on the line II—II of Figure 1.

Figure 3 shows a bottom plan view.

Figure 4 is a side elevational view of the outer warped ring.

Figure 5 shows a side elevational view of an inner warped ring.

Similar reference indicia refer to similar parts throughout the several views.

Referring in detail to the drawing A designates the running-board of a vehicle such as an automobile, to which my revoluble step-bearing is attached.

The device comprises the stationary base plate B and the revoluble upper plate C, both of circular outline, and preferably stamped from thin gauged sheet metal such as steel or brass.

The plate B has stamped into its upper surface the concentric grooves 3, 4 and 5 and the depressed recess 6 of less depth than said grooves.

The depressed element 7 is stamped downwardly in the plate C so as to nest into the recess 6 and so form a revoluble center for said plate when held together by a fastener which may well be the rivet 8 passing through a central perforation in each plate.

It will be noted that the plate C is plain from the outer edge of the element 7 to the spring of the arch formed by the raised rim 9, which curves over to produce the downwardly extending, peripheral flange 10.

It will be seen that a flat, annular concentric area of contact is provided between said plates by stamping the plate B upwardly at 11, thereby providing arch-like support for the center of the device, the feet of said arch being formed by the respective inwardly-sloping walls 12—12, thus attaining a structure of great load-sustaining capacity while using metal of light gauge with corresponding economy in cost of material and power consumed in the stamping operations; the latter a feature which enables me to produce the manufactured article with presses of less power than would be needed if heavier gauge metal had to be used.

The respective grooves 3, 4 and 5 are all preferably in the same plane.

Clips 13 are provided on the under side of the plate B, being either riveted or spot-welded thereto. Said clips may be attached at any suitable surface of the plate B so long as they do not project below the plane thereof.

In Figure 3 there are three said clips set one hundred and twenty degrees apart.

In Figure 2, two said clips are shown set diametrally, with the bolts 14 securing the device to the running board A. Said bolts are provided with flat heads adaptable to be slipped into the slots 15 and held there against rotation, either by contact with contiguous members of said plate as indicated in dotted lines at 16, Figure 3, or in other suitable manner. The lip 17 may be slightly sprung to admit the bolt-head.

The respective corrugations, or grooves 4 and 5 house the respective warped rings 18 and 19 which, when the device is assembled and stepped upon set up a squeezing action which tends to circulate lubricative grease contained within the chambered space 20 thus facilitating rotary movement of the plate C besides preventing chatter while the vehicle is in motion.

The groove 3 accommodates the packing member 21, preferably of felt-like material of resilient absorbent nature, which when the plates A and B are drawn together by the fastener 8 will fill the groove 22, thus forming a seal to prevent escape of lubricant from the cavity 20.

It will be noted by Figures 2, 4 and 5 that said rings are of circular form and round cross-section although obviously I do not wish to confine myself to the particular cross-sectional shape as other than round section could be used.

The rubber cover or mat 23 is preferably cemented to the top surface of the plate C and is reduced in thickness on the outer edge so that the bezel 24 will be disposed below the general level of said mat. Said bezel is a nice press fit over the flange 10, its lower edge 25 being slightly inturned below that of the flange 10. As so disposed and arranged said bezel forms a protection for the outer edge of said mat and tends to retain it in position, besides lending an attractive appearance and finish to the device when plated.

It will be observed that the upper surface of said mat is provided with a plurality of suction cup-elements 26, which may be arranged to form an outer ring design, and others as 27 occupying interior positions.

It will be noted by Figure 2 that said elements are adapted to cling to the foot when trodden on, by expellance of air from said elements which creates suction.

A paper or cardboard templet is provided in the package to gauge the bolt-holes to be made in the running board after which the device can be set in place and be secured by the nuts 28 engaging said bolts, and if necessary the bolt ends may be burred to lock them.

Although I have shown and described one embodiment of my invention, it is to be understood that the same is susceptible of various changes, and I reserve the right to employ such changes as may come within the scope of the claims hereto attached.

I claim:—

1. In a device of the character described, a stationary base plate, a revoluble upper plate, container-grooves in the base plate, warped, trans-slit rings in the grooves, said upper plate arranged to bear down on said rings, and means pivotally connecting said plates together.

2. In a device of the character described, a stationary base plate carrying a revoluble step plate, arched means formed in the base plate at the center thereof, and raised zones spacing depressed corrugations arranged to house antifrictional elements.

3. In a device of the character described, a stationary base plate, a revoluble step plate on the base plate, a peripheral upwardly arched element forming a corresponding groove on the under side of the step plate, sealing means cooperating with said groove and with a complemental groove in said base plate, said means adapted and arranged to retain oil within, and to exclude dust from between the plates.

4. In a device of the character described having depressed corrugations spaced apart by raised zones, clips carried by the zones, and means provided in the clips removably mounting means to attach the device to a vehicle.

In testimony whereof I affix my signature this 2nd day of June, 1931.

WILLIAM GARVIN O'BRYAN.